United States Patent [19]
Gadkari et al.

[11] Patent Number: 5,912,302
[45] Date of Patent: Jun. 15, 1999

[54] ELASTOMERIC COMPOSITIONS AND A PROCESS TO PRODUCE ELASTOMERIC COMPOSITIONS

[76] Inventors: Avinash Chandrakant Gadkari, 13827 Rosebranch Ct., Houston, Tex. 77059; Gerard Marie Vanhaeren, Vieux Chemin de L'Helpe 63, Rixensart, Belgium

[21] Appl. No.: 08/871,563

[22] Filed: Jun. 2, 1997

Related U.S. Application Data

[60] Provisional application No. 60/019,556, Jun. 11, 1996.

[51] Int. Cl.[6] .................. C08F 257/02; C08F 255/08; C08F 255/00; C08F 255/10
[52] U.S. Cl. .................. 525/127; 525/128; 525/129; 525/130; 525/131
[58] Field of Search ................................ 525/131, 127, 525/128, 129, 130

[56] References Cited

U.S. PATENT DOCUMENTS

| | | | |
|---|---|---|---|
| 3,419,534 | 12/1968 | Goodman et al. | |
| 4,111,865 | 9/1978 | Seefried, Jr. et al. | 521/137 |
| 4,302,351 | 11/1981 | Gras et al. | 252/182 |
| 4,731,416 | 3/1988 | Saunders | 525/131 |
| 5,162,445 | 11/1992 | Powers et al. | 525/333.4 |
| 5,430,118 | 7/1995 | Powers et al. | 526/347 |
| 5,670,581 | 9/1997 | Frechet et al. | 525/333.3 |
| 5,679,748 | 10/1997 | Frechet et al. | 525/333.3 |

FOREIGN PATENT DOCUMENTS

| | | |
|---|---|---|
| 0 041 192 | 12/1981 | European Pat. Off. . |
| 238001 | 9/1987 | European Pat. Off. . |
| 325997 | 8/1989 | European Pat. Off. . |
| WO 94/22950 | 10/1994 | WIPO . |
| WO 95/07945 | 3/1995 | WIPO . |
| WO 97/02305 | 1/1997 | WIPO . |

OTHER PUBLICATIONS

American Society for Testing and Materials (ASTM) D 2084–95—"Standard Test Method for Rubber Property—Vulcanization Using Oscillating Disk Cure Meter".
Zeno W. Wicks, Jr., *Progress in Organic Coatings*, v.3(1975)—pp. 73–99—"Blocked Isocyanates".
Zeno W. Wicks, Jr., *Progress in Organic Coatings*, v.9(1981)—pp. 3–28—"New Developements in the Field of Blocked Isocyanates".
Maurice Morton, ed., *Rubber Technology*, 3rd edition (1995)—Chapter 15—"Polyurethane Elasomers" by C.S. Schollenberger.
Derwent Abstract in English for EP 0 041 192 A.

*Primary Examiner*—Jeffrey C. Mullis
*Attorney, Agent, or Firm*—Myron B. Kurtzman; Brent M. Peebles

[57] ABSTRACT

This invention relates to elastomeric composition and a process for producing said compositions. The elastomeric composition of this invention contains the reaction product of one or more elastomer(s) containing functional groups reactive with isocyanate, one or more polyisocyanate compound(s), and one or more co-reactant compound(s) containing functional groups reactive with isocyanates.

19 Claims, No Drawings

ELASTOMERIC COMPOSITIONS AND A PROCESS TO PRODUCE ELASTOMERIC COMPOSITIONS

This is based on Provisional Application U.S. Pat. No. 60/019556 filed Jun. 12, 1996.

FIELD OF THE INVENTION

This invention relates to an elastomeric composition produced from an elastomeric copolymer of an isomonoolefin and para-methylstyrene and a process for producing the composition. The elastomeric composition of this invention contains the reaction product of one or more elastomer(s) containing functional groups reactive with isocyanate, one or more polyisocyanate compound(s), and one or more co-reactant compound(s) containing functional groups reactive with isocyanate.

BACKGROUND OF THE INVENTION

Polymer products based on isocyanates, particularly polyurethanes, polyureas, and polyamides, are typically used as coatings, adhesives, elastomers, fibers and foams. These polymer products are classified as segmented block copolymers having hard and soft segments. The hard segments are typically semi-crystalline or amorphous polymeric isocyanate-derivative segments of urethane, urea, and/or amide groups. These hard segments are considered to be the principal load bearing components of segmented block copolymers. The soft segments are flexible polymeric materials that provide impact resistance to the segmented block copolymer. The final morphology of the segmented block copolymer exhibits microphase segregation between the hard and soft segments since the soft and hard segments are chemically linked, but thermodynamically incompatible.

The most commonly used soft segment precursors, elastomers such as polyether and polyester, have oxygen in their backbone. Segmented copolymers containing these soil segments are susceptible to the oxidative and/or hydrolytic degradation and have poor aging resistance. Hydrophobic materials, such as hydroxyl-terminated polybutadiene, have been used to make polyurethanes and polyureas. However, due to the presence of double bonds in the backbone of these hydrophobic elastomers, they have very poor oxidative and thermal resistance.

U.S. Pat. No. 5,162,445 discloses functionalization of isobutylene-co-paramethylstyrene with a number of nucleophilic reagents, including diethanol amine resulting in two hydroxyl groups per functionalized styrenic moiety.

Di-isocyanate has been used to cure copolymers of isobutylene and styrene as described in EP-A2-0 325 997 and EP-A2-0 238 001. Some of the styrene moieties are modified by carboxylic acid derivatives and then by amino alcohols to facilitate curing with isocyanate. EP-A2-0 325 997 and EP-A2-0 238 001 disclose di-isocyanate curing of polymers having a molecular weight of 700 to 200,000. However, none of these disclosures discuss the use of isocyanates in combination with co-reactants to obtain segmented copolymers.

It would be desirable to develop a segmented block copolymer composition that has the strength and load-bearing characteristics of polymeric isocyanate-derivative segments such as polyurethane, polyurea, or polyamide materials, as well as other isocyanate derivatives, while having the flexibility and impact resistance derived from an elastomer. It would be even more desirable if the elastomer was resistant to degradation from oxidation or aging and possessed a high degree of hydrolytic stability and thermal resistance. It would also be desirable if the elastomer was capable of a high degree of chemical bonding with a polymeric isocyanate-derivative segment.

SUMMARY OF THE INVENTION

This invention relates to an elastomeric composition comprising isomonoolefin having from 4 to 7 and para-alkyl styrene copolymer crosslinked with a polymeric isocyanate derivative segment and a process for producing the composition. The elastomeric composition of this invention is formed by the reaction of one or more elastomer(s) having functional groups reactive with isocyanate, one or more polyisocyanate compound(s), and one or more co-reactant compound(s) different from the elastomer and also having functional groups reactive with isocyanate but preferably having little or no reactivity with the functional groups of the elastomer.

The elastomeric composition is produced by reacting the functionalized elastomer, containing functional groups reactive with isocyanates, with the polyisocyanate compound and co-reactant compound. The polyisocyanate compound and co-reactant compound react to form polymeric isocyanate-derivative hard segments. The polyisocyanate compound also reacts with the functional groups of the functionalized elastomer resulting in chemical linkages of hard segments to the elastomers backbone. These chemical linkages result in grafting of hard segments to the elastomer and/or crosslinking of the elastomer.

DETAILED DESCRIPTION OF THE INVENTION

Starting materials for the preparation of the composition of this invention include: the functionalized elastomer, a polyisocyanate compound, and a co-reactant compound. In addition to these primary components, the composition can optionally contain a catalyst and various additives and fillers typically used in the rubber compounding art.

Functionalized Elastomer

In one embodiment, the functionalized elastomer is prepared by nucleophilic substitution of the halogen of a halogenated elastomer with a nucleophilic compound which contains a functional group reactive with isocyanate. Preferred nucleophilic compounds are those that will retain only one group reactive with an isocyanate after attachment to the halogenated elastomer via nucleophilic substitution of the halogen.

A preferred halogenated elastomer is a halogen-containing copolymer of a $C_4$ to $C_7$ isomonoolefin and a para-alkstyrene (I-PAS) copolymer. For elastomeric copolymer products, the para-alkylstyrene moiety may range from about 0.5 weight percent to about 50 weight percent, preferably from about 1 to about 25 weight percent, more preferably from about 2 to about 20 weight percent of the copolymer. The halogen content of the copolymers may range from above zero to about 10 weight percent, preferably from about 0.1 to about 7.5 weight percent, more preferably from about 0.2 to about 5 weight percent, even more preferably from about 0.5 to about 2 weight percent. The halogen is preferably bromine, chlorine, or mixtures thereof, more preferably bromine. Particularly preferred copolymers comprise from about 5 to about 10 weight percent para-alkylstyrene, and from about 1 to about 2 weight percent halogen, for example, bromine.

The preferred isomonoolefin is isobutylene. The preferred para-alkylstyrene is para-methylstyrene. Preferred I-PAS copolymers have a number average molecular weight ($M_n$) of at least about 25,000, preferably at least about 30,000, more preferably at least about 60,000, even more preferably at least about 80,000. The copolymers preferably, have a ratio of weight average molecular weight ($M_w$) to number average molecular weight ($M_n$), i.e., $M_w/M_n$, of less than about 6, preferably less than about 4, more preferably less than about 2.5 and, most preferably about 2. The brominated I-PAS copolymer obtained by the polymerization of these particular monomers produces copolymers having substantially homogeneous compositional distributions. These I-PAS copolymers, as determined by gel permeation chromatography (GPC), have narrow molecular weight distributions and substantially homogeneous composition distributions, or compositional uniformity over the entire range of molecular weights. At least about 95 weight percent of the I-PAS copolymer product has a para-alkylstyrene content within about 10 weight percent, and preferably within about 7 weight percent, of the average para-alkylstyrene content for the overall composition, and preferably at least about 97 weight percent of the copolymer product has a para-alkyistyrene content within about 10 weight percent, more preferably within about 7 weight percent, of the average para-alkylstyrene content for the overall composition. These I-PAS copolymers are essentially random copolymers, such that in any particular polymer chain the para-alkylstyrene and isoolefin units will be essentially randomly distributed throughout that chain.

The halogen-containing copolymers useful in the practice of the present invention have a substantially homogeneous composition distribution and include the para-alkylstyrene moiety represented by the formula:

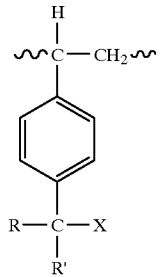

in which R and R' are independently selected from the group consisting of hydrogen and alkyls, said alkyls preferably having from 1 to 5 carbon atoms, and X is a halogen, preferably selected from the group consisting of bromine, chlorine and mixtures thereof, more preferably bromine. A detailed description of these halogen-containing copolymers of a $C_4$ to $C_7$ isomonoolefin and a para-alkylstyrene and a description of a process for making these copolymers are disclosed in U.S. Pat. No. 5,162,445, which is ally incorporated herein by reference for purposes of U.S. patent practice.

The copolymers used in this invention typically comprise essentially the same ratio of the isoolefin to the para-alkylstyrene components at all selected fractions thereof. This random distribution of halogenated para-alkystryrene monomers results in a random distribution of linkage sites for the polymeric isocyanate derivative segments both along each I-PAS copolymer backbone and throughout the final composition. The backbone primarily consists of an isoolefin having from 4 to 7 carbon atoms and a random distribution of para-alkylstyrene groups. The polymer backbone is completely saturated and highly hydrophobic. Due to these characteristics compositions based on a chemically linked mixture of this I-PAS copolymer and polymeric isocyanate-derivative segments have improved oxidative, thermal, and hydrolytic stability a relative to the prior art.

"Polymeric," as used in this specification and appended claims in conjunction with isocyanate-derivative segment, means polymer-like or having repeating units like a polymer. In this respect, it is intended to include any segment of two or more repeating units. For example, a di-urethane moiety is included within the scope of the term "polymeric isocyanate-derivative segment." "Polyisocyanate," for purposes of this specification and the appended claims, is defined as an isocyanate compound containing two or more isocyanate groups.

Due to the unique microstructure of polyisobutylene portion of the backbone, the elastomeric composition of this invention products has good damping properties and low gas permeability. Furthermore, incorporation of desired functionalities along the polymer backbone is easily facilitated overcoming the problems associated with the non-quantitative nature of the telechelic end-group functionalization. The I-PAS copolymer used in this invention facilitates introduction of any number of functional groups along the polymer backbone. Two or more functional groups per backbone are preferred to insure chemical linkage of the copolymer and polymeric isocyanate derivative segments such as polyurethane, polyurea, polyamide or mixtures thereof.

Halogenation of an elastomer followed by nucleophilic substitution of the halogen with a nucleophilic reagent containing a functional group reactive with isocyanate is a preferred method of producing a functionalized elastomer useful in this invention. It should be understood that any process that will produce an elastomer having a saturated backbone and containing pendant functional groups reactive with isocyanates is within the scope of this invention.

The reactivity of the nucleophilic reagent used and the reaction conditions may vary, as is well known in the art. In a preferred embodiment, the nucleophilic substitution reactions are preferably run at temperatures varying from about 0° C. to about 200° C., more preferably from about 10° C. to about 150° C., as limited by thermal stability of the nucleophilic reagent, the base polymer and the functionalized product polymer. Reaction times are preferably chosen to allow the nucleophilic displacement reaction to exhaust either the electrophilic sites of the halogenated styrenic comonomers of the elastomeric copolymer or the nucleophilic reagent and typically range from about 30 seconds to about 1 week, preferably from 5 minutes to about 24 hours.

Preferred solvents are saturated $C_4$–$C_7$ hydrocarbons, halogenated hydrocarbons or tetrahydrofiran (THF). Often it is desirable to add a more polar co-solvent, such as a $C_1$–$C_4$ alcohol during the nucleophilic displacement reaction in order to dissolve the nucleophilic reagent and provide solvation stabilization for the nucleophilic displacement reaction. Aromatic solvents such as benzene, toluene, and chlorobenzene are preferred solvents fore the base polymer over the entire composition range and provide a reaction medium favorable for many nucleophilic displacement reactions.

For additional information about processes to produce these functionalized copolymers, see U.S. Pat. No. 5,162,445, which is fully incorporated herein by reference for purposes of U.S. patent practice.

The functional groups appended to the elastomeric I-PAS copolymers are any group reactive with isocyanate, preferably hydroxyl, amine, and/or carboxyl groups, more preferably hydroxyl groups. Suitable nucleophilic reagents containing hydroxyl groups are aliphatic amino-alcohol containing primary or secondary amino groups such as ethanolamine, diethanolamine, diisopropanolamine, 2-(methylamino)ethanol, 2-(ethylamino)ethanol. Aliphatic amino-alcohol containing secondary amino groups are preferred. Another suitable nucleophilic reagent containing hydroxyl groups are alkyl ammonium and/or metal phenolates such as 2-(-hydroxyethoxy)phenolate, benzyl alcohol phenolate or carboxylate. Preferred nucleophilic reagents containing amine groups are aliphatic or cycloaliphatic amines such as propylamine, butylamine, hexylamnine, or cyclohexylamine. Other suitable nucleophilic reagents containing amine groups are alkylammonium/metal phenolates or carboxylates. Preferred nucleophilic reagents containing carboxyl groups are alkylammonium and/or metal monocarboxylates of dicarboxylic acids such as tetramethyl-, tetraethyl-, tetrabutyl-ammonium monocarboxylate of succinic acid, glutaric acid, adipic acid, pimelic acid, suberic acid, azelaic acid, sebacic acid, phtalic acid. In one embodiment, the amount of functional groups pendant from the functionalized copolymer is preferably in the range of from 0.1 to 5 mole percent, more preferably from 0.2 to 2 mole percent, even more preferably from 0.3 to 1.5 mole percent of the functionalized copolymer. The halogen content of the functionalized polymer will preferably be less than 2 mole percent, more preferably less than 1 mole percent, even more preferably less than 0.1 mole percent, most preferably less than 0.01 mole percent of the functionalized copolymer.

Functionalized elastomers useful in this invention can also be prepared by other methods such as, but not limited to, oxidative functionalization of copolymers containing alkylstyrene as disclosed in U.S. Ser. No. 08/628,416, filed Apr. 5, 1996, and functionalization of copolymers by metalation as disclosed in U.S. Ser. No. 08/444,950, filed May 19, 1995, the disclosures of which are fully incorporated herein by reference for purposes of U.S. patent practice.

Polyisocyanate Compound

Polyisocyanate compounds useful in this invention are polyfunctional isocyanate compounds, preferably organic isocyanate compounds, containing from 2 to 4 isocyanate groups, preferably 2 isocyanate groups. Preferred organic isocyanates include, but are not limited to aliphatic di-isocyanates, cycloaliphatic di-isocyanates, and aromatic di-isocyanates. Aliphatic di-isocyanates are trimethylene-, tetramethylene-, pentamethylene-, hexamethylene- and dodecamethylene-di-isocyanate. Exemplary cycloaliphatic di-isocyanates are 1,4-di-isocyanate-cyclohexane, 3-isocyanatomethyl-3,5,5-trimethylcyclohexylisocyanate (also called isophorone di-isocyanate), and 4,4'-dicyclohexylmethane di-isocyanate. Exemplary aromatic di-isocyanates are tolylene di-isocyanate, xylylene di-isocyanate, phenylene di-isocyanate, 4,4'-diphenylmethane di-isocyanate, and naphthalene di-isocyanate. Among the above organic polyisocyanates, the aliphatic and cycloaliphatic organic polyisocyanates are preferred.

Polymeric polyisocyanates such as those containing dimers or trimers of an isocyanate can also be used. In particular, polymeric polyisocyanates such as those containing dimers or trimers of tolylene di-isocyanate or of 3-isocyanatomethyl-3,5,5-trimethylcyclohexylisocyanate may also be used. Such dimeric compounds contain uretidinedione groups and the trimeric compounds contain triisocyanurate groups, obtained by dimerization or trimerization of isocyanate. Polymeric polyisocyanates such as dimers, trimers, pentamers of tolylene di-isocyanate or of isophorone di-isocyanate are also suitable.

The polyisocyanates used in the practice of this invention can be free or blocked isocyanates. For the purposes of this specification and the appended claims, a blocked isocyanate is an adduct of a polyisocyanate compound with an isocyanate-blocking agent in equivalent molar ratios of isocyanate groups to blocking groups. An unblocked isocyanate is an —NCO group which has been liberated from its blocking agent in a reaction triggered by heat.

Typical blocking agents are compounds containing an active hydrogen atom such as those based on phenols, lactams, alcohols, mercaptans, imides, imidazoles, amines, ureas, carbamic acid salts, oximes, sulfites, and active methylene e.g., diethyl malonate, ethyl acetoacetate, acetylacetone, etc. Furthermore, appropriate isocyanate-blocking agents are typically monofunctional, acidic-hydrogen containing compounds or active-methylene containing compounds which are reactive towards isocyanate groups and which will unblock from the isocyanate function at temperatures between 100° and 200° C. Suitable blocking agents are for example oxime based, such as acetoxime, methylethylketoxime, cyclohexanoxime, lactam based, such as $\epsilon$-caprolactam, $\delta$-valerolactam, $\gamma$-butyrolactam, phenol based, such as phenol, cresol, tert-butyl phenol, imide-based, such as succinimide, phtalimide, maleimide, carbamate based, such as phenyl N-phenylcarbamate, 2-oxazolidone. Suitable blocking agents also include active-methylene based compounds such as diethyl malonate, ethylacetoacetate, methyl acetoacetate, acetylacetone, etc. Blocked isocyanates are disclosed in *Progress in Organic Coatings*, vol. 3, pp. 73–99 (1975) and vol. 9, pp. 3–28 (1981) by Z. W. Wicks Jr., incorporated by reference herein for the purposes of U.S. patent practice.

Low volatility, high boiling temperature blocking agents are preferred so as to minimize their volatilization during heating and/or curing. The type of blocking agent to be used is also dictated by their unblocking rate at a given curing temperature. For example, oxime-based blocking agents are known to unblock at a lower temperature than phenol-based agents. A very suitable blocking agent for use in this invention is $\epsilon$-caprolactam.

A particularly suitable blocked polyisocyanate 3-isocyanatomethyl-3,5,5-trimethylcyclohexylisocyanate (also called isophorone di-isocyanate and abbreviated as IPDI), and it contains 15% by weight isocyanate, with all isocyanate functions being blocked with $\epsilon$-caprolactam. Such compounds are described in U.S. Pat. No. 4,302,351, fully incorporated herein for purposes of U.S. patent practice.

Co-reactant Compound

The "co-reactant," or "chain extender," is a relatively small, usually difunctional molecule. When the co-reactant and the polyisocyanate are combined under reaction conditions, they react to form structures rich in isocyanate-derivative moieties, such as urethane, urea, or amide. For additional information on chain extenders, see Chapter 15 of *Rubber Technology*, Morton, 3d ed., 1995.

In one embodiment, the co-reactant compound is any low molecular weight compound, preferably less than 1000 daltons, containing at least 2 or more preferably from 2 to 4, preferably 2 functional groups reactive with isocyanate. Preferred functional groups are one or a mixture of hydroxyl, amine, and carboxyl groups. Preferably, the co-reactant compound is selected such that the functional groups of the co-reactant are not reactive with the functional groups of the functionalized elastomer. Preferred co-reactants are diols, diamines, a dicarboxylic acids, compounds of mixed functionality such as amino alcohols, or mixtures thereof provided that if a mixture is present, then the individual co-reactants are not reactive with one another under the conditions used to react the co-reactant compound with the isocyanate.

Preferably, the co-reactant is a low molecular weight short chain alcohol, amine, amino-alcohol, dicarboxylic acid, or mixtures thereof, that are reactive with isocyanate but not with one another under conditions used to react the co-reactant composition with the polyisocyanate. Preferred co-reactant compounds have a molecular weight of form about 60 to about 500, more preferably from about 70 to about 400, even more preferably from about 80 to about 350, and most preferably from about 80 to about 300. Preferred alcohols have at least 2 hydroxyl groups and can have as many as 4 or more. Preferred amines have at least 2 amine groups and can have as many as 4 or more. Preferred amino alcohols contain at least one amine functional group and at least one hydroxyl functional group and the total number of functional groups per molecule can be as high as 4 or more.

In another preferred embodiment, co-reactants include but are not limited to ethylene glycol, 1,2- and 1,3-propylene glycol, 1,4-butanediol, 2-methyl-1,3-propanediol, neopentyl glycol, 1,4-bis(hydroxymethyl)cyclohexane, cyclohexane diol, diethylene glycol, triethylene glycol, dipropylene glycol and dibutylene glycol, hexane triol, trimethylolethane, trimethylolpropane, pentaerythritol. Ethoxylated diol or triol such as ethoxylated trimethylolpropane can also be used. They are polyethers prepared by alkoxylation of a polyalcohol such as glycerol or sorbitol with propylene oxide and ethylene oxide, they contain at least two hydroxyl end groups and are of molecular weight between about 280 to about 6000 and characterised by an hydroxyl number between about 25 to 600 mg KOH/g. Suitable polyether polyols in this invention are compounds of molecular weight below 500. Preferred co-reactants are the low molecular weight non-alkoxylated polyols, they result in polymer segments that are hard and stiffer because of the high concentration of urethane groups formed in the polymer chain by reaction with a polyisocyanate. Mixtures of two or more polyols can also be used.

Process

In a preferred embodiment, the polyisocyanate and the co-reactant are added to a solution of functionalized elastomer under agitation. Any liquid that is a solvent for the functional elastomer while not being reactive with isocyanate can be used. Useful solvents for this purpose are polar solvents such as tetrahydrofuran (THF), halogenated hydrocarbon solvents such as methylene chloride, chloroform, chlorobenzene, and the like, or non-polar solvents such as aliphatics, cycloaliphatics, and aromatic hydrocarbon solvents. Preferred hydrocarbon solvents are pentane, hexane, cyclohexane, benzene, toluene, and xylene. The amount of solvent used will be such that the viscosity of the functional elastomer solution is not too high, typically the solution concentration will be 2 to 50% depending on the elastomer molecular weight.

The co-reactant and the polyisocyanate may be added to the functional elastomer solution in any order or simultaneously. Preferably, the polyisocyanate is added to the elastomer solution first, optionally with a catalyst, and allowed to react under sufficient agitation. Preferred reaction conditions include a reaction time in the range of from about 30 seconds to 4 hours, preferably 1 minute to 5 hours, more preferably about 2 minutes to about 1 hour, most preferably about 10 minutes to about 30 minutes; and a reaction temperature of 150° C. or less, preferably 100° C. or less, more preferably 80° C. or less, to produce an elastomer containing isocyanate functional groups prior to the addition of the co-reactant. The co-reactant is added while mixing and the reaction is continued for from about 30 seconds to about 24 hours, preferably from about 1 minute to about 10 hours, more preferably from about 2 minutes to about 5 hours, even more preferably about 10 minutes to about 4 hours at 150° C. or less, preferably 100° C. or less, more preferably 80° C. or less. The viscosity of the solution increases progressively during the reaction. After a desired reaction time, as set by viscosity increase of the mixture, the mixture is then transferred into a mold or coated onto a surface and the solvent is evaporated. The material is further heated at 50° C. to 120° C. to remove all traces of solvent yielding an elastomeric composition. Reaction pressure is not critical at any stage of the process but is typically at or near atmospheric pressure or can be performed at higher pressures in applications such as compression or injection molding.

The molar ratio of the isocyanate groups to the total of the functional groups reactive with isocyanate, both in the co-reactant compound and in the functionalized elastomer is preferably in the range of from about 0.9:1 to about 1.2:1, more preferably from about 0.95:1 to about 1.1:1, even more preferably from about 1:1 to about 1.05:1.

The molar ratio of the isocyanate groups to the functional groups reactive with isocyanate in the functionalized elastomer is preferably at least 10:1, more preferably at least 15:1, even more preferably at least 20:1.

In another preferred embodiment, a functionalized elastomer, a blocked polyisocyanate, and a co-reactant are first mixed and, thereafter, reacted at elevated temperature. When a blocked polyisocyanate is used, the isocyanate will not react with the functional groups of the functionalized elastomer or the co-reactant compound until the mixture of components is heated to a temperature above the unblocking temperature of the blocked isocyanate. This allows the components to be mixed without added solvent in conventional rubber mixing equipment such as a Brabender® mixer or a two roll rubber mill. The functionalized elastomer is preferably added first, various rubber compounding additives and fillers may then be added such as for example, carbon black, clays, silica, and the like, conventionally used in the rubber compounding art. Preferably, the co-reactant is then added slowly and stepwise, the mixing being performed to thoroughly and uniformly disperse the co-reactant and the other components without excessive heat build up. Mixing time will depend on the type of rubber mixing equipment used, but is typically from about 4 to about 10 minutes to complete. The blocked polyisocyanate is added last and mixing is continued, typically for about 1 to about 3 minutes, to ensure good dispersion. In this mixing step, the components should be heated to a temperature no greater than the temperature at which the blocked isocyanate will unblock to any significant degree, preferably 150° C. or less, more preferably 140° C. or less, even more preferably 130° C. or less. Thereafter, the mixture is transferred into a heated curing mold where unblocking of the polyisocyanate and reaction with the functional elastomer and co-reactant can be effected. A preferred temperature for the unblocking and reaction of isocyanate is in the range of from 150° C. to 200° C., more preferably in the range of from 160° C. to 190° C., even more preferably in the range of from 170° C. to 180° C. The temperature and time to complete the reaction can be established using a Monsanto Oscillating Disc Rheometer and procedures described in detail in ASTM D 2084, incorporated by reference for purposes of U.S. Patent practice.

When mixed in the absence of solvent, the functionalized elastomer, the blocked polyisocyanate, and the co-reactant are mixed and reacted in proportions such that the functionalized elastomer content is from 70 to 95 weight percent, more preferably from 80 to 90 weight percent based upon the total weight of the components mixed.

A catalyst may also be added. Catalysts useful for increasing the isocyanate reaction rate or reducing the reaction temperature included but are not limited to tertiary amines such as 1,4-diazabicyclo[2.2.2.]octane DABCO), or N,N'-dialkyl piperazine, N,N'-dialkyl piperidine, or tin containing compounds such as dibutyltin dilaurate (DBTDL), stannous octoate, or dioctyltin thiocarboxylate.

Suitable amounts of catalyst optionally used include a molar ratio of catalyst to isocyanate contained in the curing agent of from 0.01 to 0.3, preferably from 0.05 to 0.2. When used, the catalyst may be mixed with the polymer first, or as the last ingredient added.

Various rubber compounding additives and fillers may be added to the polymer. Non-limiting examples include fillers such as carbon black, talc, clays, silica, pigments and the like, unreactive processing oils, and suitable optional additives including antioxidants, antistatic agents, processing aids, plasticizers and the like conventionally used in the rubber compounding art. The sequence and conditions of mixing employed are well known in the art primarily for the purpose of thoroughly and uniformly dispersing all components of the composition in the polymer solution without excessive heat build-up.

Elastomeric Composition

The co-reactant reacts with polyisocyanates to form polymeric isocyanate-derivative segments containing urethane, urea, amide, or a mixture of two or more of these moieties, preferably the hard segments are polyurethane, polyurea, or polyamide. Chemical bonding between the elastomer backbone and hard segments takes place via reaction between the elastomer functional groups and the isocyanate groups of the polyisocyanate compounds. Alcohols react with the isocyanates to form urethane moieties, amines react with polyisocyanates to form urea moieties, and carboxyls react with polyisocyanates to form amide moieties.

The resulting elastomeric composition produced with either blocked or free polyisocyanate-derivatives preferably has an polymeric isocyanate-derivative segment content in the range of from about 1 to about 50 weight percent, more preferably in the range of from about 5 to about 40 weight percent, even more preferably in the range of from about 10 to about 30 weight percent.

The resulting elastomeric composition preferably contains the elastomer content in the range of from about 50 to about 99 weight percent, more preferably in the range of from about 20 to about 95 weight percent, even more preferably in the range of from about 70 to about 90 weight percent.

The resulting elastomeric composition is at least 70 weight percent insoluble, preferably at least 75 weight percent insoluble, more preferably at least 80 weight percent insoluble, even more preferably at least 90 weight percent insoluble, most preferably at least 95% insoluble, when soaked in THF at 50° C. for at least 48 hours.

Polymeric isocyanate-derivative segments of the elastomeric composition of this invention preferably has a melting point ($T_m$) by differential scanning calorimetry (DSC) of greater than 100° C., more preferably greater than 150° C., and even more preferably greater than 200° C.

The elastomeric composition preferably has a glass transition temperature (Tg) by DSC of from about −80° C. to about 0° C., preferably less than about −25° C., more preferably less than −40° C., and even more preferably less than −50° C.

The elastomeric composition of this invention has a dynamic tensile modulus between about 0° C. as measured by Polymer Lab™ Mark II DMTA instrument at a frequency of 10 Hz, preferably greater than 1 MPa up to 1,000 MPa, more preferably greater than 2 MPa, even more preferably greater than 4 MPa, even more preferably greater than 6 MPa, and most preferably greater than 10 MPa.

In addition to the elastomer, the isocyanate, and the co-reactant, other compounds used in the segmented/copolymer formulations leading to the elastomeric composition can include catalyst and blowing agents.

The compositions of this invention exhibit very good tensile properties, and dynamic mechanical properties are retained over a broad temperature range. These compositions also show very low oil swell and therefore useful oil resistance properties. In addition, the saturated hydrocarbon backbone of the elastomeric copolymer results in improved oxidative and thermal stability over polyesters and polyethers. The hydrophobic nature of the elastomeric copolymer used in this invention also imparts excellent hydrolytic stability to these products. Other useful characteristics of the compositions of this invention are high damping of compounded elastomers and low permeability to gases of films or membranes.

These materials are useful in a variety of applications such as flexible foams, elastomers, coatings, adhesives, sealants, membranes, binders and the like. End use applications include insulating materials, linings for closure of containers, shoe soles, potting compounds, or sound dampening pads.

The following are examples of variations that are within the scope of the invention. The isoolefin and alkyl styrene monomers in the elastomeric copolymer can each be homogeneous throughout the copolymer or can each be mixtures of monomers meeting the stated parameters. The elastomeric copolymer can be a single polymer or a blend of elastomeric copolymers wherein each blend component is within the stated parameters for the elastomeric copolymer. Each component of the polyisocyanate and the co-reactant compound can also be homogeneous or a mixture of compounds within the defined

EXAMPLES

The initial isobutylene-containing polymers for the synthesis of polymers A, B, C, D and E used in the examples of this invention are copolymers of isobutylene, paramethylstyrene (PMS) and, bromoparamethylstyrene (BrPMS). Three grades were used for the synthesis of the polymers in the examples of this invention. Grades EDMX 89-1 and EDMX 90-10 are marketed by Exxon Chemical Europe, Inc. and Exxon Chemical Company (Houston, Tex.), under the trademark EXXPRO™. The compositions of the EXXPRO™ copolymers and copolymer X, used in the invention, are shown in Table 1.

TABLE 1

| | Starting Polymers | | |
|---|---|---|---|
| Copolymer | X | EDMX 89-1 | EDMX 90-10 |
| isobutylene, mole % (wt. %) | 97.88 (94.91) | 97.47 (93.93) | 96.29 (91.02) |
| paramethylstyrene (PMS), mole % (wt. %) | 1.53 (3.12) | 1.85 (3.76) | 2.51 (5.0) |

TABLE 1-continued

| | Starting Polymers | | |
|---|---|---|---|
| Copolymer | X | EDMX 89-1 | EDMX 90-10 |
| monobromoPMS (BrPMS), mole % (wt. %) | 0.59 (1.97) | 0.68 (2.31) | 1.2 (3.98) |
| Average Mw (GPC) | 332,535 | 330,000 | 305,000 |
| Average Mn (GPC) | 90,980 | 125,000 | 161,000 |

Synthesis of Polymer A

Polymer A is an isobutylene-paramethylstyrene (I-PMS) copolymer containing pendant hydroxyl functionality obtained by nucleophilic substitution on copolymer X using 2-(methylamino)ethanol as nucleophilic reagent. A 10 g portion of copolymer X was dissolved in a solvent mixture containing 160 ml of toluene and 30 ml of tetrahydrofuran (THF). This polymer solution was added to a reaction vessel containing, under stirring, 0.71 g of 2-(methylamino)ethanol (9.45 moles/mole Br). The reaction mixture was maintained between 60° C. and 65° C. for four hours. The polymer was then recovered by precipitation in methanol. The polymer was further purified by washing and kneading in methanol to complete the removal of unreacted 2-(methylamino)ethanol and then dried at 60° C. under vacuum. The polymer contained no monobenzylic bromine, and the analysis as summarized below in Table 2 indicates an essentially complete conversion of monobenzylic bromine to methylamino ethanol functionality.

Synthesis of Polymer B

Polymer B is an I-PMS copolymer containing pendant hydroxyl functionality obtained by the same method as Polymer A. A 5 g portion of copolymer X was dissolved in 50 ml of THF and heated to between 50° C. and 55° C. Then, 0.354 g of 2-(methylamino)ethanol (10 moles/mole Br) was added to the polymer solution under stirring. The reaction mixture was maintained between 50° C. and about 55° C. for two hours. The polymer was recovered, dried, and purified by the method described in Polymer A. Polymer B contained no monobenzylic bromine according to $^1$H NMR analysis. The analysis of Polymer B is shown in Table 2.

Synthesis of Polymer C

A 5 g portion of EMDX 89-1 copolymer was dissolved in a solvent mixture containing 80 ml of toluene and 20 of THF. A 0.561 g portion of 2-(methylamino)ethanol (12.7 moles/mole Br) was added to the polymer solution under stirring. The reaction mixture was maintained between 50° C. and 55° C. for two hours. The polymer was recovered, dried, and purified by the same method as described in Polymer A. The polymer contained no monobenzylic bromine according to $^1$H-NMR analysis. The analysis of Polymer C is shown in Table 2.

Synthesis of Polymer D

Polymer D is an I-PMS copolymer containing pendant secondary amine functionality obtained by substitution of the benzylic bromine of copolymer X by an alkylamine. A 5.0 g portion of copolymer X was dissolved in 100 ml of THF and this solution was added, under stirring, to a reaction vessel containing 0.5 g portion of n-hexylamine (10 moles/mole Br). The reaction mixture was maintained between 60° C. and 63° C. for 15 hours. The polymer was then recovered, washed and dried as previously described. The analysis of Polymer D is shown in Table 2.

Synthesis of Polymer E

Polymer E is an I-PMS copolymer containing pendant hydroxyl functionality obtained by nucleophilic substitution of the mono benzylic bromine by 2-(2-hydroxyethoxy) phenolate as the nucleophilic reagent. 30 g of EXXPRO™ EDMX 89-1 copolymer was dissolved in 525 ml of cyclohexane. In a separate container, 1.11 g of 2-(2-hydroxyethoxy)phenol (7.2 mmoles, 2.05 moles per mole of benzylic bromine) was dissolved in 10 ml of tetrahydrofuran (THF) and to this solution is added 6.8 ml of 1M methanol solution of tetrabutylammonium bromide (6.8 mmoles, 1.934 moles per mole of benzylic bromine). This mixture was stirred for 15 minutes and added to the I-PMS copolymer solution with intense stirring. The container was rinsed with an additional 65 ml of THF and washings were added to the I-PMS copolymer solution. The reaction mixture was heated to between 60 and 65° C. and maintained at this temperature for 2–4 hours. The functionalized polymer was then recovered by precipitation in methanol. The polymer was further purified by washing and kneading in methanol to complete the removal of unreacted 2-(2-hydroxyethoxy) phenolate and tetrabutylammonium hydroxide and then dried at 80° C. under vacuum. The polymer contained no monobenzylic bromine, and the $^1$H NMR analysis as summarized below in Table 2 indicates an essentially complete conversion of monobenzylic bromine to 2-(2-hydroxyethoxy) phenoxy functionality.

Synthesis of Polymer F

Polymer F is an I-PMS copolymer containing pendant hydroxyl functionality obtained by nucleophilic substitution of the mono benzylic bromine by 2-(2-hydroxyethoxy) phenolate as the nucleophilic reagent. A 30 g portion of EXXPRO™ EDMX 90-1 copolymer was dissolved in 525 ml of cyclohexane. In a separate container, 0.64 g of 2-(2-hydroxyethoxy)phenol (4.15 mmoles, 0.685 moles per mole of benzylic bromine) was dissolved in 10 ml of THF and to this solution is added 3.8 ml of 1M methanol solution of tetrabutylammonium hydroxide (3.8 mmoles, 0.627 moles per mole of benzylic bromine). This mixture was stirred for 15 minutes and added to the I-PMS copolymer solution with intense stirring. The container was rinsed with an additional 65 ml of THF and washings were added to the I-PMS copolymer solution. The reaction mixture was maintained at between 60° C. and 65° C. for two hours. The functionalized polymer was then recovered by precipitation in methanol. The polymer was further purified by washing and kneading in methanol and then dried at 50° C. under vacuum. The $^1$H NMR analysis is summarized in Table 2.

Synthesis of Polymer G

Polymer G is an I-PMS copolymer containing pendant carboxyl functionalities obtained by nucleophilic substitution of the mono benzylic bromine by a monocarboxylate of a dicarboxylic acid as nucleophilic reagent. A 50 g portion of EXXPRO™ EDMX 89-1 copolymer was dissolved in 900 ml of THF and the solution heated to 60° C. In a separate container, 13.92 g of sebacic acid (68.8 mmoles, 11.74 moles per mole of benzylic bromine) was dissolved in 250 ml THF. A 20.65 ml portion of a 1M methanol solution of tetrabutyl ammonium hydroxide (20.65 mmoles, 0.30 mole per mole diacid) was then added under agitation. A white precipitate was formed. This suspension was added to the 60° C. polymer solution under agitation, and allowed to react for 6 hours at between 60° C. and 65° C. At the end of the reaction, 5 cc of a 37% aqueous solution of HCl was added to convert all the carboxylate into acid. The polymer was then recovered by precipitation in a 50/50 methanol/acetone mixture. The polymer was further purified by washing and kneading in methanol, and then dried at 70° C. under vacuum. About 89% of the benzylic bromine contained on the paramethylstyrene is converted into the acid derivative as PMS—OCO—$(CH_2)_8$—COOH.

TABLE 2

Functionalized Polymers

| | Polymer | | | | | | | | | | | | | |
|---|---|---|---|---|---|---|---|---|---|---|---|---|---|---|
| | A | | B | | C | | D | | E | | F | | G | |
| ¹H-NMR | mole % | wt. % | mole % | wt. % | mole % | wt. % | mole % | wt. % | mole % | wt. % | mole % | wt. % | mole % | wt % |
| isobutylene | 97.92 | 95.03 | 98.16 | 95.55 | 97.59 | 92.28 | 98.0 | 95.01 | 98.14 | 92.95 | 96.68 | 90.90 | 97.53 | 92.82 |
| paramethylstyrene (PMS) | 1.51 | 3.10 | 1.31 | 2.70 | 1.77 | 3.60 | 1.48 | 3.03 | 1.85 | 3.75 | 2.09 | 4.13 | 1.78 | 3.57 |
| monobromo PMS (BrPMS) | 0 | 0 | 0 | 0 | 0 | 0 | 0 | 0 | 0 | 0 | 0.48 | 1.59 | 0.077 | 0.26 |
| methylamino ethanol PMS | 0.57 | 1.88 | 0.53 | 1.75 | 0.642 | 2.12 | 0 | 0 | 0 | 0 | 0 | 0 | 0 | 0 |
| n-hexyl-NH—PMS | 0 | 0 | 0 | 0 | 0 | 0 | 0.52 | 1.96 | 0 | 0 | 0 | 9 | 0 | 0 |
| 2-(2-hydroxyethoxy) phenoxy-PMS | 0 | 0 | 0 | 0 | 0 | 0 | 0 | 0 | 0.66 | 3.05 | 0.75 | 3.38 | 0 | 0 |
| HOOC—(CH₂)₈—COO—PMS | 0 | 0 | 0 | 0 | 0 | 0 | 0 | 0 | 0 | 0 | 0 | 0 | 0.62 | 3.36 |

Polymer A contained 0.0983 mmole of hydroxyl functionality per gram of polymer.
Polymer B contained 0.0941 mmole of hydroxyl functionality per gram of polymer.
Polymer C contained 0.1117 mmole of hydroxyl functionality per gram of polymer.
Polymer D contained 0.0902 mmole of amine functionality per gram of polymer.
Polymer E contained 0.1128 mmole of hydroxyl functionality per gram of polymer.
Polymer F contained 0.1250 mmole of hydroxyl functionality per gram of polymer.
Polymer G contained 0.1050 mmole of carboxyl functionality per gram of polymer.

Gel Permeation Chromatography (GPC) is used to measure $M_n$ and $M_w$ of starting materials. GPC data was obtained on a Waters 150 ° C. chromatograph equipped with Waters Ultrastyragel HT 103 Å, 104 Å, 105Å and HTGE mixed bed columns in THF at 35° C. and with a flow rate of 1.0 ml/min, equipped with a Refractive Index (RI) and UV detector. GPC values reported are polystyrene equivalent molecular weights that are converted to polyisobutylene values according to the following formula:

Log $M_{pib}$=1.059 log $M_{ps}$–0.387

$M_{pib}$=polyisobutylene equivalent molecular weight
$M_{ps}$=polystyrene equivalent molecular weight Proton Nuclear Magnetic Resonance (¹H NMR) data was obtained on a Varian 500 MHz spectrometer.

Hydrolytic Stability is used to measure samples in the form of tensile specimens that were suspended in hot water at 85° C. for 4 days. These samples were blot dried and their tensile properties were measured after 24 hours. These tensile properties after the hot water treatment were compared to the tensile properties of untreated specimens of the same material to calculate the percent change in tensile strength and elongation at break. Less reduction in tensile strength corresponds to better hydrolytic stability of the material.

Tensile measurements were done at ambient temperature on Instron Series IX Automated Materials Testing System 6.03.08. Micro tensile specimens (dog-bone shaped) width of 0.08 inches (0.20 cm) and a length of 0.2 inches (0.05 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported.

Example 1
Preperation of Elastomeric Composition

Inside a dry box 2.4 gm of the elastomer hydroxyl derivative (functionalized elastomer; polymer A in Table 2, 0.236 mmole of —OH) was weighed in a reaction jar containing a magnetic stirrer. It was stirred with about 35 ml of anhydrous THF at 50° C. for about 2.5 hours to obtain a homogenous solution. In a separate glass vial, 0.442 gm of the polyisocyanate, 4, 4'-diphenylmethane di-isocyanate MDI; 3.5 moles NCO), was dissolved in 4 ml of THF and this solution was added to the intensely stirred polymer solution at ambient temperature. Heating was started and the hot-plate temperature was maintained at about 70° C. resulting in a reaction mixture temperature of about 50° C. After about 30 minutes of reaction, a mixture containing 0.155 gm of co-reactant, butanediol (3.45 mmole OH), and 2 ml of 0.025 molar solution of DABCO catalyst in THF was added to the reaction mixture followed by 3 ml of THF. The final NCO/OH ratio was 0.96 including the OH groups on Polymer A and the butane diol. Heating was started and the hot-plate temperature was maintained at 70° C. resulting in a reaction mixture temperature was about 50° C. The viscosity of the mixture increases progressively during the reaction. After about 4 hours of reaction, the viscosity of the mixture was very high. At this point the reaction mixture was poured into a Teflon mold. The solvent was evaporated overnight at room temperature. The resulting transparent film was further dried at about 110° C. for 24 hours in a vacuum oven.

This resulting elastomeric composition contains about 20 weight percent of urethane-containing hard segments based on the combined weight fraction of MDI and butanediol (BD). 18.9 weight percent of the elastomeric composition dissolved in THF extraction at 50° C. for 48 hours.

Example 2
Preperation of Elastomeric Composition

Inside a dry box 2.0 g of I-PAS copolymer hydroxyl derivative (functionalized elastomer; polymer A in Table 2, 0.2 mmole of OH) was weighed in a reaction jar containing magnetic stirrer. It was stirred with 30 ml of anhydrous THF at 50° C. for 2.5 hours to obtain a homogenous solution. In a separate glass vial, 0.65 g of MDI (5.2 mmoles NCO) was dissolved in 3 ml of THF and this solution was added to the intensely stirred polymer solution at ambient temperature. Heating was started and the intensely stirred polymer solution at ambient temperature. Glass vial was rinsed with an additional 2 ml of THF and the washings are added to the reaction mixture. Heating was started and the hot-plate temperature was maintained at 70° C. resulting in a reaction mixture temperature was about 50° C. After 30 minutes of reaction, a mixture containing 0.225 g of butanediol (4.99 mmole OH) and 2 ml of 0.025 molar solution of DABCO catalyst in THF was added to the reaction mixture. Another 3 ml of THF was added to the reaction mixture. The final NCO/OH ratio was 1.0 including the OH groups of polymer A and the butanediol. Heating was started and the hot-plate temperature was maintained at 70° C. resulting in a reaction mixture temperature of about 50° C. The viscosity of the mixture increased progressively during the reaction. It was observed that, after 4.5 hours of reaction the viscosity of the mixture was very high. At this point the reaction mixture was poured into a Teflon mold. The solvent was evaporated overnight at ambient temperature. The resulting film was further dried at 110° C. for 70 hours in a vacuum oven. This material contains 30.4 wt. % of urethane hard segments based on the combined weight fraction of MDI and BD in the formulation. THF extraction at 50° C. for at least 48 hours gave 7% soluble fraction.

Example 3
Preperation of Elastomeric Composition

Inside a dry box 2.39 g of elastomer-hydroxyl derivative (polymer B in Table 2, 0.22 mmole of OH) was weighed in a reaction jar containing a magnetic stirrer. It was stirred with 30 ml of anhydrous THF at room temperature overnight to obtain a homogeneous solution. To this solution was added 1.8 ml of 0.025 molar solution of DABCO catalyst in THF and it was heated to 50° C. (hot plate temperature 70° C.). In a separate glass vial, 0.453 g of MDI (3.6 mmoles NCO) and 0.153 g of butanediol (3.4 mmoles OH) are dissolved in 3 ml of THF and this solution was added to the stirred polymer solution at a temperature of 50° C. An additional 5 ml of THF was added to the reaction mixture. The final NCO/OH ratio was 0.99 including the OH groups of Polymer B and the butanediol. Heating was started and the hot-plate temperature was maintained at 70° C. resulting in a reaction mixture temperature of about 50° C. The viscosity of the mixture increased progressively during the reaction. It was observed that, after 3 hours of reaction the viscosity of the mixture was very high. At this point the reaction mixture was poured into a Teflon mold. The solvent was evaporated overnight at ambient temperature. The resulting film was further dried at 115° C. for 48 hours in a vacuum oven. This material contains 20.3 wt. % of urethane hard segments based on the combined weight fraction of MDI and BD in the formulation. THF extraction at 50° C. for at least 48 hours gave 4.3% soluble fraction.

Example 4
Preperation of Elastomeric Composition

Inside a dry box 2.0 g of elastomer-hydroxyl derivative (polymer C in Table 2, 0.223 mmole of OH) was weighed in a reaction jar containing magnetic stirrer. It was stirred with 35 ml of anhydrous THF at room temperature overnight to obtain a homogenous solution. To this solution was added 2 ml of 0.025 molar solution of DABCC catalyst in THF and it was heated to 50° C. (hot plate temperature 70° C.). In a separate glass vial, 0.651 g of MDI (5.2 mmoles NCO) and 0.219 g of butanediol (4.85 mmoles OH) are dissolved in 5 ml of THF and this solution was added to the stirred polymer solution at a temperature of 50° C. An additional 5 ml of THF was added to the reaction mixture. The final NCO/OH ratio was 1.025 including the OH groups of Polymer C and the butanediol. Heating was started and the hot-plate temperature was maintained at 70° C. resulting in a reaction mixture temperature of about 50° C. The viscosity of the mixture increased progressively during the reaction. It was observed that, after 4 hours of reaction the viscosity of the mixture was very high. At this point the reaction mixture was poured into a Teflon mold. The solvent was evaporated overnight at ambient temperature. The resulting film was further dried at 115° C. for 70 hours in a vacuum oven. This material contains 30 wt. % of urethane hard segments based on the combined weight fraction of MDI and BD in the formulation. THF extraction at 50° C. for at least 48 hours gave 2.3% soluble fraction.

Comparative Example 5C
Preparation of Elastomeric Composition

An elastomeric composition was prepared using a polyether polyol instead of an I-PAS copolymer. Inside a dry box 7.014 g of Voranol™ 232-034 polyol (4.25 mmole of OH) and 2.384 g of MDI (19.1 mmoles NCO) were mixed and dissolved in 17 ml of THF at room temperature for 15 minutes. To this solution was added a mixture containing 0.6245 g of butanediol (13.86 mmoles OH) and 1 ml of 0.025 molar solution of DABCO catalyst in THF. An additional 3 ml of THF was added to the reaction mixture. The final NCO/OH ratio was 1.052 including the OH groups of Voranol™ 232-034 polyol (a polyether polyol, available from Dow Chemical Co., Midland, Mich., U.S.A.) and the butanediol. Heating was started and the hot-plate temperature was maintained at 70° C. resulting in a reaction mixture temperature of about 50° C. The viscosity of the mixture increased progressively during the reaction. After one hour reaction, the reaction mixture was poured into a Teflon mold. The solvent was evaporated overnight at ambient temperature. The resulting film was further dried at 80° C. for 30 hours in a vacuum oven. This material contains 30 wt. % of urethane hard segments based on the combined weight fraction of MDI and BD in the formulation and soft segments of the polyether polyol. THF extraction at 50° C. for at least 48 hours gave 10.2% soluble fraction.

Example 6
Preparation of Elastomeric Composition

Inside a dry box 2.42 g of the elastomer secondary amine derivative (polymer D in Table 2, 0.218 mmole of —NH) was weighed in a reaction jar containing magnetic stirrer. It was stirred with about 35 ml of anhydrous THF at 50° C. for about 2.5 hours to obtain a homogenous solution. In a separate glass vial, 0.311 gm of 2,4-toluene di-isocyanate (TDI; 3.57 mmoles NCO) was dissolved in 4 ml of THF and this solution was added to the intensely stirred polymer solution at ambient temperature. Glass vial was rinsed with additional 2 ml THF and the washings are added to the reaction mixture. After about 20 minutes of reaction at ambient temperature, 0.3140 gm diethyltoluene diamine (DETDA; 3.52 mmole —NH$_2$) in 5 ml of THF was added to the reaction mixture. Heating was started and the hot-plate temperature was maintained at about 70° C. resulting in a reaction mixture temperature of about 50° C. The final NCO/NH+NH$_2$ ratio was 0.955 including the NH groups on Polymer B and the NH$_2$ groups on the DETDA. The reaction mixture was maintained at between 50° C. and 70° C. The viscosity of the mixture increased progressively during the reaction. It was observed that, after about 1.5 hours of reaction the viscosity of the mixture was very high. At this point the reaction mixture was poured into a teflon mold. The solvent was evaporated overnight at room temperature. The resulting transparent film was further dried at about 110° C. for 24 hours in a vacuum oven.

This elastomeric composition contains about 20 weight percent of urea-containing hard segments based on the combined weight fraction of 2,4-TDI and DETDA in the formulation. 1.64 weight percent of the elastomeric composition was dissolved in THF after extraction at 50° C. for 48 hours, indicating a high degree of reaction between the functional elastomer, the co-reactant and the polyisocyanate.

Example 7
Preparation of Elastomeric Composition

Inside a dry box 2.0 g of the elastomer secondary amine derivative (polymer B in Table 2, 0.18 mmole of —NH) was weighed in a reaction vessel equipped with a magnetic stirrer. It was stirred with about 30 ml of anhydrous THF at 50° C. for about 2.5 hours to obtain a homogeneous solution. In a separate glass vial, 0.6252 g of MDI (5.0 mmoles NCO) was dissolved in 5 ml of THF and this solution was added to the intensely stirred polymer solution at ambient temperature. After about 10 minutes of reaction at ambient temperature, 0.2215 g butanediol (4.92 mmole OH) in 2 ml of THF was added to the mixture. Heating was started and the hot-plate temperature was maintained at about 70° C. resulting in a reaction mixture temperature of about 50° C. The final NCO/(NH+OH) ratio was 0.98 based on the NH and OH groups in Polymer B and the butane diol, respectively. The reaction mixture was maintained at between 50° C. and 70° C. The viscosity of the mixture increased progressively during the reaction. It was observed that, after about 30 hours of reaction the viscosity of the mixture was very high. At this point the reaction mixture was poured into a teflon mold. The solvent was evaporated overnight at ambient temperature. The resulting transparent film was further dried at about 110° C. for 24 hours in a vacuum oven.

This material contains about 30 weight percent of urethane/urea-containing hard segments based on the combined weight fraction of MDI and butane diol in the formulation. 10.6 weight percent of the elastomeric composition dissolved in THF after extraction at 50° C. for 48 hours.

TABLE 3

Stress-Strain Properties of Polyurethane/Urea Products

| Ex. # | Wt %[1] PU and/or PUrea | Young's Modulus, psi (MPa) | Stress @ 100% strain psi (MPa) | Tensile strength psi (MPa) | % Strain @ break |
|---|---|---|---|---|---|
| 1 | 20 (PU) | 370 (2.55) | 333 (2.30) | 2,510 (17.3) | 1,180 |
| 2 | 30 (PU) | 1,151 (7.94) | 889 (6.13) | 2,350 (16.2) | 773 |
| 6 | 20 (PUrea) | 510 (3.52) | 500 (3.45) | 2,620 (18.1) | 790 |
| 7 | 30 (PU + PUrea) | 1,200 (8.27) | 970 (6.69) | 2,240 (15.4) | 570 |

[1] PU = polyurethane;
PUrea = polyurea

Examples 1, 2, 6, and 7 show the mechanical properties of elastomeric compositions of the claimed invention containing from 20 to 30 weight percent of polyurethane and/or polyurea. Examples 1, 2, 6, and 7 show a useful balance of mechanical properties for polyurethane application.

TABLE 4

Hydrolytic Stability of Polyurethane/Polyurea Products

| Example No. | Tensile Strength, psi (MPa) | | | Elongation @ Break (%) | | |
|---|---|---|---|---|---|---|
| | Before | After | % Change | Before | After | % Change |
| 2 | 2,352 (16.2) Avg. of 3 | 1,923 (13.3) Avg. of 5 | −18.2 | 773 Avg. of 3 | 708 Avg. of 5 | −8.4 |
| 5C (comparative) | 2,313 (16.0) Avg. of 3 | 1,151 (7.9) Avg. of 4 | −50.2 | 729 Avg. of 3 | 566 Avg. of 4 | −22.4 |

Example 2 shows the mechanical properties of elastomeric compositions of the claimed invention. Comparative Example 5C shows the mechanical properties of polyurethane compositions of the prior art measured under the same conditions. Example 2 shows a superior hydrolytic stability, showing much less change in both tensile strength and elongation at break versus that of Comparative Example 5C.

All documents described herein are fully incorporated by reference in their entirety, including any priority documents and testing procedures, for purposes of U.S. patent practice. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A composition comprising the reaction product of:
   a) an elastomeric copolymer of an monoisoolefin having from 4 to 7 carbon atoms and a para-alkylstyrene, said elastomeric copolymer containing pendant functional groups reactive with an isoyanate,
   b) a polyisocyanate, and
   c) a co-reactant comprising functional groups reactive with an isocyanate.

2. The composition of claim 1 wherein polymeric isocyanate-derivative segment comprises one or more moieties selected from the group consisting of urethane, urea, and amide.

3. The composition of claim 1 wherein said polymeric isocyanate-derivative segment is one of polyurethane, polyurea, polyamide, or polyurethane-co-urea.

4. The composition of claim 1 wherein the polymeric isocyanate-derivative segment is present in an amount in the range of from about 1 to about 50 weight percent based on the combined weight of the polymeric isocyanate-derivative segment and the elastomeric copolymer.

5. The composition of claim 1 wherein the elastomeric copolymer content is from about 50 to about 99 weight percent based on the combined weight of the polymeric isocyanate-derivative segment and the elastomeric copolymer.

6. The composition of claim 1 which is at least 80 percent insoluble in tetrahydrofuran at 50° C.

7. The composition of claim 1 wherein the reaction product is formed by addition of the elastomeric copolymer, the polyisocyanate, and the co-reactant in amounts such that the ratio of the total moles of isocyanate groups present in the polyisocyanate to the total moles of the functional groups present in the elastomeric copolymer and co-reactant is in the range of from about 0.9 to about 1.2.

8. The composition of claim 1 wherein the elastomer is a copolymer of isobutylene and para-methylstyrene.

9. An article comprising the composition of claim 1.

10. A process of producing an elastomeric composition comprising combining under reaction conditions,
   a) an elastomeric copolymer of an isomonoolefin having from 4 to 7 carbon atoms and a para-alkylstyrene, said elastomeric copolymer containing pendant functional groups reactive with isocyanate,
   b) a polyisocyanate, and
   c) a co-reactant containing pendant functional groups reactive with isocyanate.

11. The process of claim 10 wherein the elastomeric copolymer pendant functional groups are selected from the group consisting of hydroxyl, amine, and carboxyl.

12. The process of claim 10 wherein the co-reactant functional groups are selected from the group consisting of hydroxyl, amine, and carboxyl.

13. The process of claim 10 wherein the elastomeric copolymer, the polyisocyanate, and the co-reactant are added in amounts such that the ratio of the total moles of isocyanate groups present in the polyisocyanate to the total moles of the functional groups present in the elastomeric copolymer and co-reactant is in the range of from about 0.9 to about 1.2.

14. The process of claim 10 wherein the combining is performed at a temperature less than or equal to 150° C.

15. The process of claim 10 wherein the polyisocyanate contains blocked isocyanate groups, said combining step producing a mixture of the elastomer, the blocked polyisocyanate, and the co-reactant.

16. The process of claim 15 wherein the combining is performed in the absence of solvent at a temperature in the range of from about 100° C. to a temperature below that at which the blocked isocyanate unblocks.

17. The process of claim 16 wherein the combining is performed at a temperature in the range of from about 100° C. to about 150° C.

18. The process of claim 16 further comprising the step of heating the mixture to a temperature above that at which the blocked isocyanate unblocks.

19. The process of claim 16 further comprising the step of heating the mixture to a temperature at a temperature in the range of from 150° C. to 200° C.

* * * * *